Aug. 25, 1942.          R. J. GAVIN ET AL          2,294,291
                         REPOURING DEVICE
                       Filed March 11, 1941

Inventor
RALPH JOSEPH GAVIN.
FRANK ALPHONSUS DEVINE.
By Howard J. Whelan.
   Attorney Patented Aug. 25, 1942

2,294,291

UNITED STATES PATENT OFFICE 2,294,291

REPOURING DEVICE

Ralph Joseph Gavin and Frank Alphonsuis Devine, Philadelphia, Pa.

Application March 11, 1941, Serial No. 382,824

4 Claims. (Cl. 53—3)

This invention refers to beverage making equipment utilizing hot water and more particularly to that suitable for the making of coffee and similar drinks in urns. It has among its objects to provide equipment for making coffee more efficiently; making it without lifting covers off the urns used in the conventional manner; providing for an automatic lifting of the coffee or beverage liquids and for circulating the same. Another object is to provide a special control valve for operating the equipment in the most desirable manner. A further object is to provide for separation of steam and vapors out of the lifted or circulated liquids in a most effective manner yet very simple way.

Other objects will become apparent as the invention is more fully set forth.

In the usual coffee urn equipment arrangements are necessary for the manual feeding of coffee and infusion of coffee, which are relatively crude, in the light of modern practices. This invention eliminates the dangerous and difficult features of making coffee in urns, by providing a valve unit capable of circulating the coffee or for wetting it, that requires the simplest manipulation to induce it to direct the liquids of coffee making through their routine of processing. The valve unit consists of a slidable rod adapted to effectively open and close a passage in its steam supply connection, a chamber for mixing and injecting the liquids and an outlet pipe having a double orifice designed to separate the steam and vapors of the liquids passing through from the liquids themselves, and thereby make the flow of coffee more uniform and continuous. The mixing chamber is also provided with connections to attach the unit to connections of the urn and other sources of liquid.

In the drawing which illustrates a form of this invention:

Figure 1:
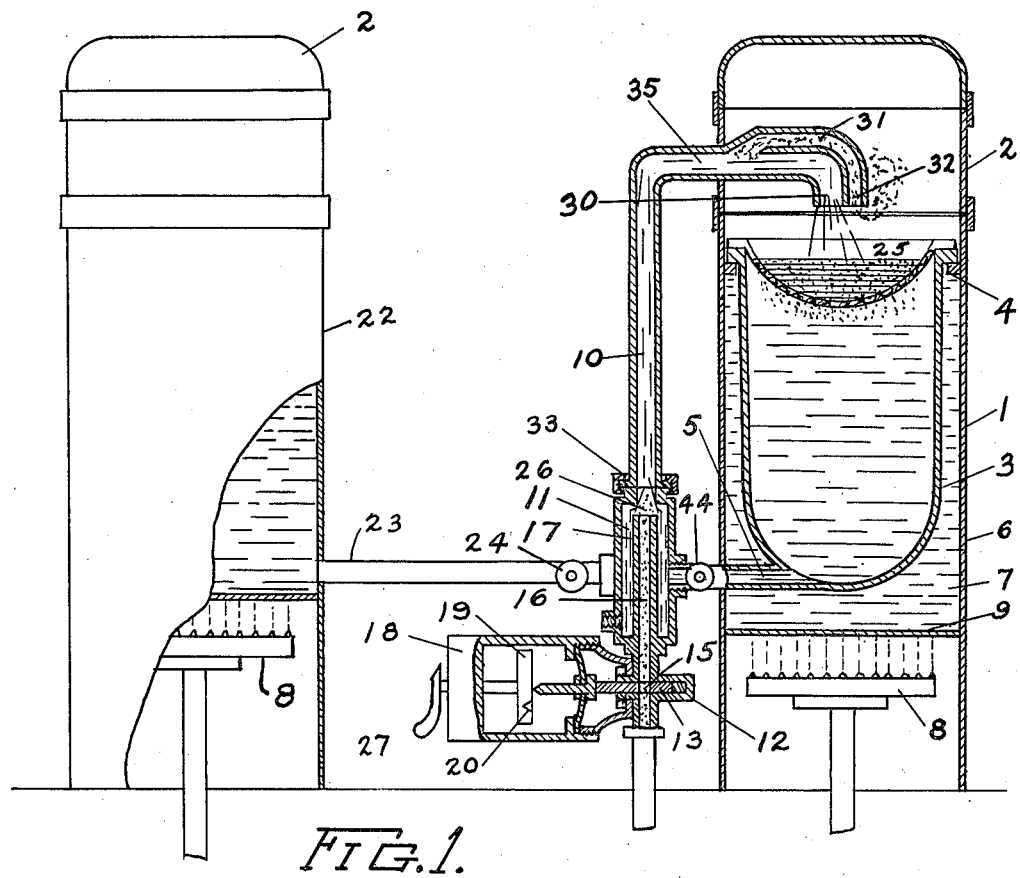
Figure 1 is a general sectional elevation of an urn and equipment embodying this invention.
Figures 2, 3:
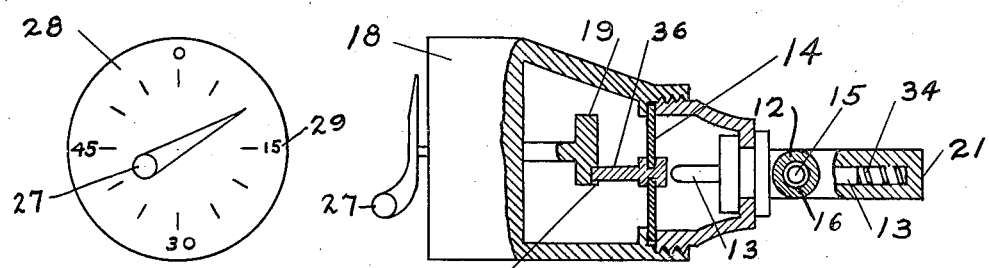
Figure 2 is front view of the clock face and indicator used in this device.
Figure 3 is a sectional elevation of the clock unit in a position with the valve unit closed.

In the construction shown in the drawing 1 represents the casing of a coffee urn, with a cover 2; a coffee receptacle 3, supported on a ring 4 within the casing and having an outlet or draw-off pipe 5. The casing is made with its lower portion 6 forming a water jacket space 7 about the receptacle. A conventional gas burner 8 is provided underneath the bottom plate 9 for heating the water jacket in the usual manner.

The circulating valve unit used in this invention, has a conductor tube 10, and is divided into three divisions 11, 35 and 12 although preferably integrally made. The division 11 is known as the injector and mixing throat, and the division 35 as the delivery and separating nozzle and division 12 as the control valve section. The conductor tube may if preferred operate on a swivel joint 33.

The control valve section 12 consists of a slidable valve rod 13 which contacts pin 36 resiliently held by a diaphragm 14 and a spring 34. This valve rod is preferably made cylindrical and and has a slotted passage 15 through it. This slotted passage 15 allows the steam to pass through when it is aligned properly with the passage 16 in the injector pipe 17 and thus eject the water or coffee infusion through the tubing 10. The control valve is chronologically operated at 18 and set in predetermined manner.

A disc 19 is mounted on and rotated by the clock 18, and at the proper moment allows the rod 13 to either close or open the valve opening at 15 to suit the arrangement predetermined therefor. In the drawings, a groove 20 is provided in the face of the disc 19 that allows the pin 36 to move into it under the action of the resilient member 14 and spring 34, and rod 13, and open the valve passage, when the groove and end portion of the pin 36 align with one another. A suitable casing or body 21 is provided around the valve mechanism and is secured to the section 12.

Another beverage urn 22 is shown at the side of the urn 1, for the purpose of providing hot water through the piping 23. A valve 24 controls the entrance of hot water supply. The urn 1, is provided with the conventional receptacle 25 for holding the coffee grounds, and has a valve 44 to control repouring the coffee.

The injector tube 17 is not made like the usual injector tube, but has straight sides of uniform diameter and straight bore, and is positioned in the central portion of the section 11 which is enlarged to about three times the diameter of the injector tube, the central portion extends so as to be spaced at 26 above the injector pipe 17 as indicated. This arrangement has been found to permit the handling and circulation of coffee infusion and water at 212° F. and over. In the use of the ordinary injector or ejector this is not feasible. The clock 18 is made so that one revolution of the indicator handle 27 will wind the unit to run for one hour or other predetermined period. The face 28 of the clock is marked with suitable indices 29 to indicate the amount of time the circulator is to operate.

In the operation of the device the valve rod 13 would be placed in open position and the steam allowed to pass through the inner tube 17. The steam takes the water or beverage in the section 11 and lifts it to the delivery nozzle where it separates the water, to flow through the lower passage and orifice 30 and the steam out of the higher passage 31 and through the orifice 32. Before this arrangement was made the outflow of steam and water would be accompanied by considerable spluttering and splashing and un-uniform flow.

While but one form of the invention is indicated in the drawing, it is not desired to limit this application to this particular form or in any other way otherwise than limited by the scope thereof, as it is appreciated that other forms could be made that would use the same principles and come within the field of the appended claims. Having thus described the invention, what is claimed is:

1. A circulator of the class described in the combination with a beverage urn, comprising a tubing having plural sections for valve control, ejector mechanism and discharge of the steam and water therethrough, said valve control being operated chronologically, the ejector mechanism for lifting liquids at relatively high temperatures, and a discharge having plural passages superimposed over one another to promote the specific gravitational separation of the steam and liquid.

2. In a device of the class described, a conductor tube having a discharge portion provided with plural orifices superimposed over one another for the separation and delivery of steam and liquid, an injector portion for steam with a straight sided ejector tube opening into a mixing chamber situated below the discharge portion for receiving the injected mixture of steam and liquid therethrough for passage to the discharge portion, and a valve control having a valve rod movable into the injector portion to control the flow of steam therethrough in a predetermined manner, and means for attaching the conductor with a beverage urn for circulating the beverage liquid thereof.

3. In a device of the class described, a conductor tube having a discharge portion provided with plural superimposed orifices for the specific gravitational separation and delivery of steam and liquid, an injector portion for steam with a straight sided ejector tube opening into a mixing chamber situated below the discharge portion for receiving the injected mixture of steam and liquid therethrough for passage to the discharge portion, and a diaphramal valve control having a valve rod movable into the injector portion to control the flow of steam therethrough in a predetermined manner, and means for attaching the conductor with a beverage urn for circulating the beverage liquid thereof, and means for swivelling the discharge portion and controlling its position.

4. In combination with a beverage urn, a circulating valve unit comprising a conductor tube adapted for vertical placement at the side of the urn with its discharge portion bent over horizontally for insertion in the upper chamber of the urn and having its outlet portion enlarged into a pair of superimposed passages with orifices aligned in the same horizontal plane, an injector section and chamber attached to the lower portion of the said tube and vertically disposed and a diaphramal chronologic valve having a control operable in the said tube in a horizontal plane disposed under the ejector section and chamber for allowing steam to pass therethrough for forcing beverage water to the discharge portion, and connections for water and steam provided at predetermined portions of the unit.

RALPH JOSEPH GAVIN.
FRANK ALPHONSUIS DEVINE.